United States Patent
Hansen

(10) Patent No.: US 10,473,513 B2
(45) Date of Patent: Nov. 12, 2019

(54) METHOD AND APPARATUS FOR GRAVIMETRIC METERING OF POWDERY BULK MATERIAL

(71) Applicant: Rockwool International A/S, Hedehusene (DK)

(72) Inventor: Lars Elmekilde Hansen, Roskilde (DK)

(73) Assignee: Rockwool International A/S, Hedehusene (DK)

( * ) Notice: Subject to any disclaimer, the term of this patent is extended or adjusted under 35 U.S.C. 154(b) by 276 days.

(21) Appl. No.: 15/563,152

(22) PCT Filed: Mar. 31, 2016

(86) PCT No.: PCT/EP2016/057052
§ 371 (c)(1),
(2) Date: Sep. 29, 2017

(87) PCT Pub. No.: WO2016/156488
PCT Pub. Date: Oct. 6, 2016

(65) Prior Publication Data
US 2018/0073913 A1    Mar. 15, 2018

(30) Foreign Application Priority Data
Mar. 31, 2015   (EP) .................................... 15161968

(51) Int. Cl.
*G01G 11/00* (2006.01)
*G01G 11/08* (2006.01)
*G01G 23/14* (2006.01)

(52) U.S. Cl.
CPC ........... *G01G 11/08* (2013.01); *G01G 11/003* (2013.01); *G01G 23/14* (2013.01)

(58) Field of Classification Search
CPC ....... G01G 11/08; G01G 11/003; G01G 23/14
See application file for complete search history.

(56) References Cited

U.S. PATENT DOCUMENTS 4,484,678 A * 11/1984 Walker .................... F42B 39/28
                                                                206/3
5,670,751 A    9/1997 Hafner
(Continued)

FOREIGN PATENT DOCUMENTS

EP          0123777 A1    11/1984
WO       03002469 A1      1/2003

OTHER PUBLICATIONS

W Hubbard et al: Expansion Joint Design Guide Expansion Compensators Pressure Balanced Model MC Double End Model MC With Anchor Base Model MN With Special Flanges Model MNLC Welded Diaphram-Type Model MC Model With Tie Rods Model MN IWTH Weld Ends Liner, Feb. 5, 2009 (Feb. 5, 2009), XP055197863, Retrieved From the Internet: URL:http://www.metraflex.com/pdf/metraflexexpansion_joints.pdf [Retrieved on Jun. 23, 2015] p. 14,15.

(Continued)

*Primary Examiner* — Randy W Gibson
(74) *Attorney, Agent, or Firm* — Dinsmore & Shohl LLP

(57) ABSTRACT

The present invention concerns a method and an apparatus for gravimetric metering of a powdery bulk material, said system comprising a storage container accommodating the bulk material, a feeding pipe for feeding bulk material from the storage container to a dosing container, a dosing discharge device for continuously discharging bulk material from the dosing container to a discharge pipe and on to a discharge line, wherein said dosing container is mounted on at least one weighing cell, and wherein the feeding pipe is provided with a first flexible tube member and the discharge pipe is provided with a second flexible tube member, and wherein the first flexible tube member comprises a first compensator and a second compensator with a tubular member there between.

14 Claims, 3 Drawing Sheets

(56) References Cited

U.S. PATENT DOCUMENTS

| | | | |
|---|---|---|---|
| 6,722,294 B2* | 4/2004 | Cabrera-Llanos ... | G01G 13/028 110/341 |
| 7,368,671 B2* | 5/2008 | Volkmann ............ | B65G 53/60 177/116 |
| 2006/0165495 A1 | 7/2006 | Krebs | |

OTHER PUBLICATIONS

Rubber Design, Vibration and Noise Control, Apr. 18, 2013, XP055197865, Retrieved From the Internet: URL:http://www.silentlinegroup.com/dokuman/systems/propulsion-systems/rubber/bellows.pdf[Retrieved on Jun. 23, 2015, p. 21,22.

* cited by examiner

METHOD AND APPARATUS FOR GRAVIMETRIC METERING OF POWDERY BULK MATERIAL

REFERENCE TO RELATED APPLICATIONS

This application is a U.S. national stage of PCT/EP2016/057052, filed Mar. 31, 2016 which claims priority from EP15161968.1, filed Mar. 31, 2015, the entire content of each application is incorporated herein by reference.

FIELD OF THE INVENTION

The present invention relates to an apparatus for gravimetric metering of a powdery bulk material, said system comprising a storage container accommodating the bulk material, a feeding pipe for feeding bulk material from the storage container to a dosing container, and a dosing discharge device for continuously discharging bulk material from the dosing container to a discharge pipe and on to a discharge line, wherein said dosing container is mounted on at least one weighing cell, and wherein the feeding pipe is provided with a first flexible tube member and the discharge pipe is provided with a second flexible tube member. An apparatus of this kind is known from U.S. Pat. No. 5,670,751.

BACKGROUND OF THE INVENTION

A so-called cyclone furnace is described in WO 03/002469. A mixture of a preheated combustion air and powdered coal (or other fuel) suspended in air, is fed into a combustion chamber. In the combustion chamber, the suspended particulate material/materials and air circulate, creating a cyclone circulation system (or approaching a creation of a cyclone circulation system). The suspended fuel is then combusted in the combustion chamber, in the presence of the suspended particulate mineral material. This is commonly referred to as a cyclone furnace. The suspension of coal in preheated air, and the particulate mineral material, is introduced through the top or close to the top of the combustion chamber.

This combustion should take place in the top of the combustion chamber, but if the air and fuel mixture is not correct, the combustion may take place in the exhaust pipe extending upward from the combustion chamber, which is undesirable as it causes the temperature to drop inside the combustion chamber and therefore reduces the efficiency of the mineral melting process. In order to control this process it is found that an accurate feeding of the fuel, such as powdered coal, is very important.

To ensure a constant feed of powdered coal, this feeding must be gravimetrically constantly dosed so that the right mixture of combustion fuel (such as powdered coal) and oxygen is controlled constantly.

The fuel in the form of powdered coal is accommodated in a one or more storage container, from which batch filling of one or more dosing containers takes place. A continuous material feed then is carried out, from at least one dosing container, for further processing of the material. As described in U.S. Pat. No. 5,670,751, the dosing container is supported on weighing cells. However, depending on the amount of material which is present in the storage container, the pressure differences in the system, or other factors, that can affect the weighing cells, the measurement of the weighing cells may be influenced and thereby become inaccurate. In order to compensate for this, a flexible tube compensator is provided on the feeding pipe between the storage container and the dosing container and another compensator is provided on the discharge line from the dosing container. Besides these measures, an electronic metering control is provided in the system disclosed in U.S. Pat. No. 5,670,751. A similar solution is known from EP 0 123 777. Although such correction means can reduce the problem of inaccurate weighing measurements, it has in some applications of gravimetric bulk material feeding, such as the feeding of powdered coal to a cyclone furnace, proven insufficient, in particular during the refilling of the dosing container(s), as both the storage container and the dosing container have some external displacements as the weight of the contents change.

SUMMARY OF THE INVENTION

It is therefore an object of the present invention to achieve an improved weighing accuracy in an apparatus for gravimetric metering of a powdery or granular bulk material.

This object is achieved by an apparatus for gravimetric metering of a powdery bulk material of the initially mentioned kind, wherein the first flexible tube member comprises a first compensator and a second compensator with a rigid tubular member arranged between the first compensator and the second compensator, wherein the rigid tubular member is fixed to a mounting frame, which also fixedly supports the dosage container, and wherein the mounting frame also fixedly supports the discharge pipe and the discharge line.

In a second aspect of the invention there is provided a method of gravimetric metering of a powdery bulk material, said method comprising the steps of batch feeding bulk material from a storage container through a feeding pipe to a dosing container mounted on at least one weighing cell, and continuously discharging bulk material from the dosing container to a discharge pipe by a dosing discharge device, and then discharge powdery bulk material from the discharge pipe onto a discharge line for further processing of the bulk material, whereby the gravimetric weight of the dosing container is recorded by the at least one weighing cell, and whereby the feeding pipe is made axially flexible to compensate for any external displacement of the storage container and the feeding pipe, the feeding pipe being provided with a first flexible tube member and the discharge pipe is provided with a second flexible tube member, wherein the first flexible tube member comprises a first compensator and a second compensator with a tubular member there between, and wherein the tubular member is fixed to a mounting frame, which also fixedly supports the storage container and the discharge pipe and the discharge line.

By providing double compensators in the feeding pipe, the influence of the external displacement of the storage container and the feeding pipe is eliminated. The weight of the content in the storage container will cause the container to deflect somewhat. This deflection will be absorbed in the double compensator so that it does not influence the weighing cells supporting the dosing container.

By fixing the tubular member to a mounting frame, which also fixedly supports the storage container and the discharge pipe and the discharge line, it is ensured that there will be no elongation or other type of displacement of the storage container and/or the feeding pipe relative to the dosing container due to e.g. the shifting of content when batch feeding the dosing container, pressure differences between the containers, change in the amount of content, etc.

In a preferred embodiment of the invention, the discharge line is a pneumatic feeding system. This ensures a reliable feeding of material to a combustion chamber or the like.

Preferably, a breather pipe is provided between upstream end of the discharge pipe and the top end of the dosing container. By the invention it is realised that the breather pipe may be provided in addition to the double compensator on the feeding pipe or as an alternative thereto. The breather pipe ensures that there is the same pressure on both the flexible tube members, i.e. the compensator on the top of the dosing container at the downstream end of the feeding pipe and the compensator on the upstream end of the discharge pipe and the end of the dosing discharge device.

The feeding pipe may preferably also be provided with an air lock/sluice, in order to reduce or even eliminate any pressure differences from occurring during the batch feeding of the dosing container from the storage container.

In the preferred embodiment of the invention, the dosing discharge device is a screw conveyor adapted for continuously providing a predetermined volumetric amount of bulk material. In particular, the screw conveyor may be adapted to provide a predetermined rotational speed in order to achieve the predetermined volumetric amount of bulk material. The volume of granular bulk material is kept constant and due to the accurate gravimetric discharge, the density and thereby the amount of powdery material is kept constant, whereby the processing of the bulk material, such as the combustion of the powdery coal fuel in a cyclone furnace, is accurately controlled.

In an embodiment of the invention, a plurality of feeding pipes may be provided connecting a plurality of dosing containers to a common storage container. This configuration of having a central storage container batch feeding several dosing containers is attractive from a production efficiency point of view but it is rather impossible to achieve a satisfactory running gravimetrically updated system if the hitherto known electronic compensation for eliminating the displacements has to be used. By the present invention, however, it is found that the invention may be particularly advantageous for such a configuration of the powdery bulk material feeding system.

BRIEF DESCRIPTION OF THE DRAWINGS

In the following the invention is disclosed in further detail with reference to the accompanying drawings, in which.

DETAILED DESCRIPTION OF THE INVENTION

Figure 1:
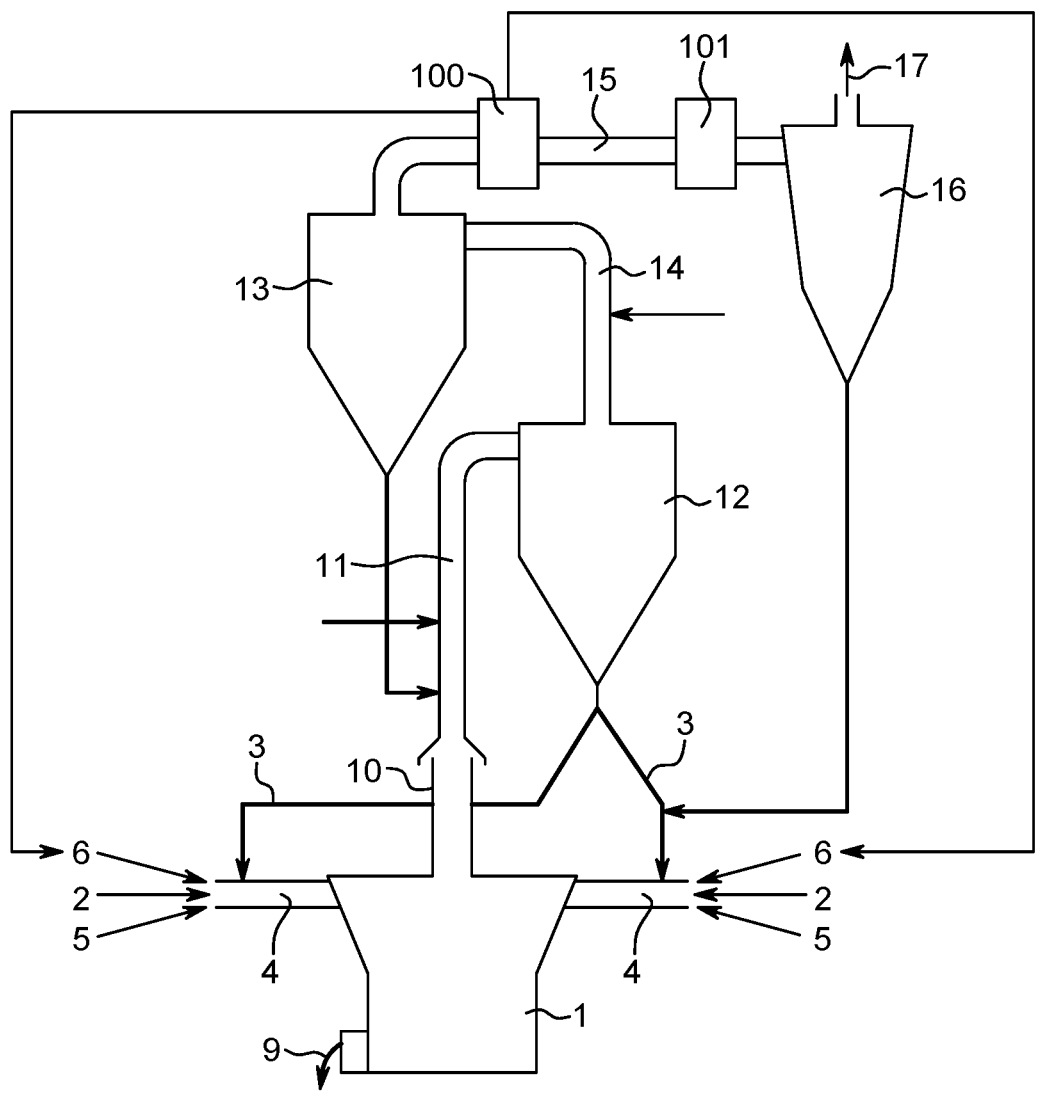
FIG. 1 is a schematic overview of a cyclone furnace installation requiring an accurate bulk material feeding.

FIG. 1 shows a circulating combustion chamber 1 which comprises a cylindrical top section, a frustoconical bottom section and a cylindrical base section. Particulate fuel, such as powdered coal is introduced into the circulating combustion chamber 1 from one or more supply sources 2. Preheated mineral material is introduced into the circulating combustion chamber 1 via a mineral material conduit 3. The coal 2 and mineral material are introduced together with combustion air via conduit 4 and secondary air which is provided in compressed air supply 5 and is introduced through at least two tangential inlets such as a lances (not shown) into the circulating combustion chamber 1 to ensure thorough mixing of the coal 2 with the combustion air 6 and to sustain the circulating motion of the combustion gases and suspended material in the circulating combustion chamber 1. Secondary fuel, in this case natural gas or a mixture of natural gas and powdered coal, may also be injected through supply (not shown) into the base section of the circulating combustion chamber 1.

The coal 2 is combusted in the combustion gas 6, which is preferably oxygen-enriched air, in the circulating combustion chamber 1. The resultant melt 9 is collected in the base zone of the circulating combustion chamber 1 and exits the chamber via an outlet. The exhaust gases are fed through the flue 10 at the top of the circulating combustion chamber 1 to the first conduit 11 where they are used to heat the granular mineral materials about to be fed into the circulating combustion chamber 1. The exhaust gases are then led to a first pre-heater cyclone 12 where they are separated from the mineral materials which are at this point mixed together. The exhaust gases flow from the first pre-heater cyclone 12 to the second pre-heater cyclone 13 via a second conduit 14. Following the second pre-heater cyclone 13 the exhaust gases flow through conduit 15 to a dust cyclone 16 and into a further treatment 17 where indirect heat exchange with the combustion gas occurs to preheat the combustion gas. The exhaust gases are then treated to make them safe to pass to the atmosphere such as by filter (not shown).

In the conduit 15 the exhaust gases may pass through a counter-flow heat-exchanger 100 which pre-heats air, which is then supplied to the combustion air 6 inlets in the cyclone furnace 1. The compressed air is not pre-heated more than the heating which occurs by the compression, which is approx. 180-200° C. A second heat-exchanger 101 is preferably also provided downstream from the counter-flow heat-exchanger 100. This second heat-exchanger 101 ensures that the temperature of the exhaust air in the conduit 15 is cooled to a predetermined temperature, for instance below 200° C., to ensure that the filters in 16 are not damaged. This heat may then be utilised for other purposes.

To ensure that the combustion of the particulate coal 2 takes place in the combustion chamber 1 and not in the flue gas exhaust 10, the mixture between fuel (particulate coal) and gas and oxygen must be right in order to achieve a temperature high enough for the mineral material to melt. If the fuel mixture is not right and there is too low a rate of oxygen the combustion may instead take place in the exhaust pipe 10 where cooling air is drawn into the exhaust gas system. A combustion in the exhaust pipe will result in a combustion that is hard to control, and it will create variation in the melt temperature, resulting in variation of the melt properties, and thereby the quality of the melt will suffer. This is to be avoided and therefore the powdery coal must be accurately fed into the fuel mixture and into combustion chamber.

Figure 2:
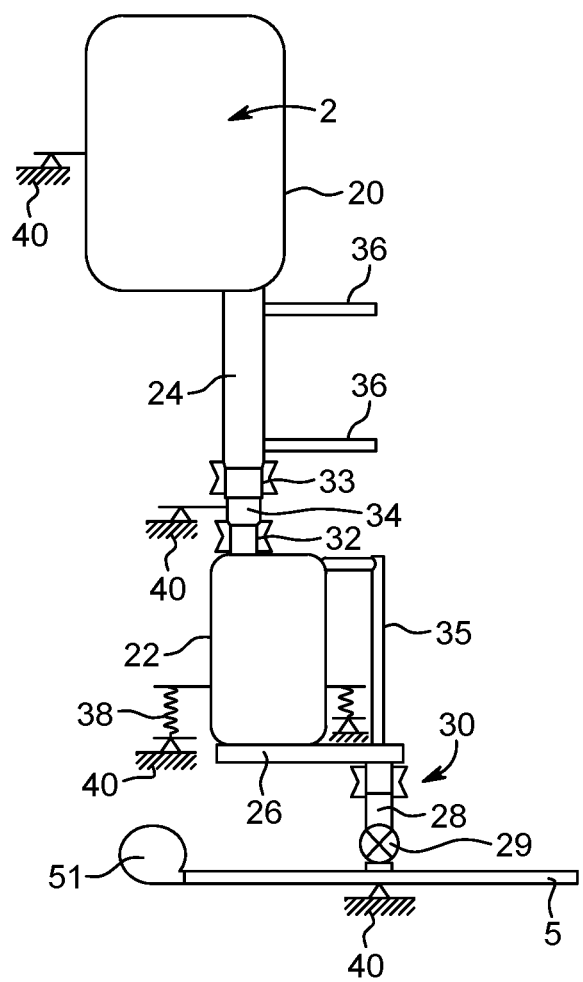
FIG. 2 is a schematic side view of an apparatus for gravimetric metering of a powdery bulk material according to an embodiment of the invention.

By an apparatus according to the invention, such as the embodiment shown in FIG. 2, this accurate feeding of powdery material can be achieved. From a storage container 20, the powdery bulk material, such as particulate coal 2, is fed through a feeding pipe 24 and into a dosing container 22. From the dosing container 22 a gravimetric and voluminously constant discharge is performed by a dosing screw conveyor 26 discharging material from the dosing container continuously into a discharge pipe 28 and into the pressurised air supply 5, which is provided with a pressurised air supply source 51, such as a roots blower. The output from the dosing screw conveyor 26 is controlled by the rotational speed of the screw conveyor 26.

The dosing container 22 is mounted via one or more weighing cells 38 to an apparatus frame (generally denoted as 40 in FIG. 2) and the weight of the dosing container 22—and thereby the amount of material therein—is constantly recorded. When the dosing container 22 is below a certain limit, it is filled from the storage container 20 by a batch feeding of more bulk material through the feeding pipe 24. During the batch feeding, i.e. when a valve 36 is open allowing powdery bulk material to flow from the storage container 20 into the feeding pipe 24 and into the dosing container 22, a sluice 36 is activated by providing a counter flow of pressurised air to maintain the air pressures in the two containers and to avoid or at least counteract any equalisation thereof during the batch feeding process.

On downstream section or outlet section of the feeding pipe 24 just above the dosing container 22 a first compensator 32 is provided. At the upstream section or entry section of the discharge pipe 28, a third compensator 30 is also provided. These two compensators 30, 32 may flex and thereby compensate for the differences in air pressure in the dosing container 22 as it is being emptied so that any changes in air pressure does not affect the reading on the weighing cells 38. A breather pipe 35 may also be provided as another measure to provide the air pressure equalisation. The breather pipe 35 connects the outlet of the screw conveyor 26 with the top of the dosing container 22.

Besides the counter-balancing first and third compensators 32, 30 provided to eliminate the influence from the pressure variations on the weighing cells 38, a second compensator 33 is also provided upstream of the first compensator 32 with a tubular pipe section 34 between the first and second compensators 32, 33. Together the first and second compensators 32, 33 act as double compensators to eliminate the influence on the weighing cells 38 from the external displacement of the bulk material during the batch feeding process. To achieve this, the tubular section 34 between the first and second compensators 32, 33 is mounted onto a frame 40. The storage container 20 is also mounted to a frame 40 and so is the discharge system as also indicated in FIG. 2. This provides a rigid system and thereby ensures accurate readings from the weighing cells 38.

Figure 3:
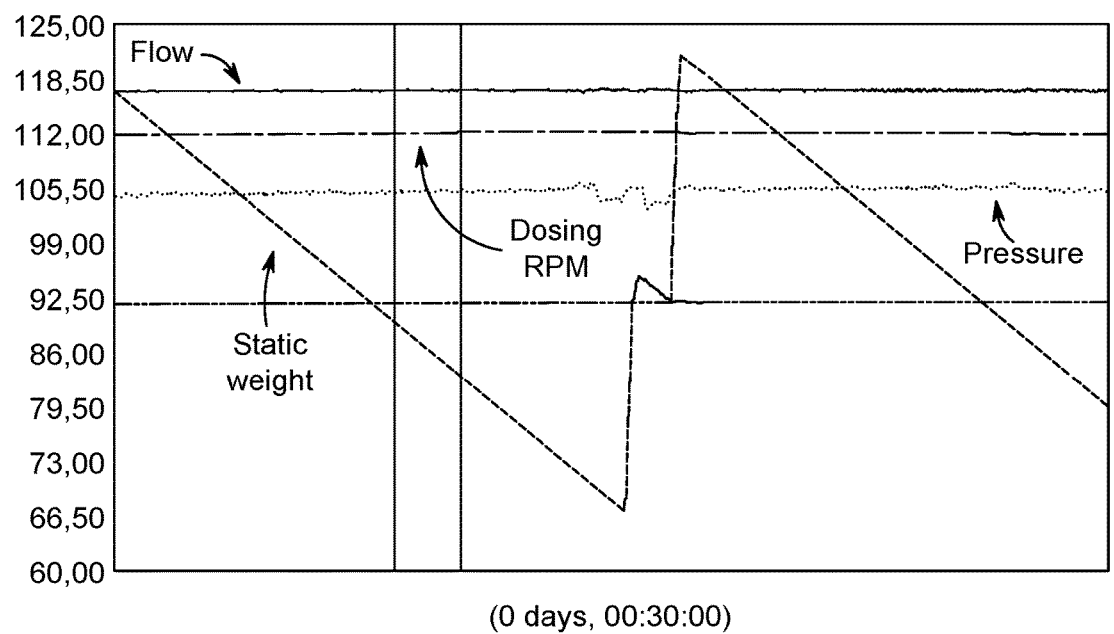
FIG. 3 is a diagram showing the selected measured parameters over time in a gravimetric metering system according to the invention.

This is also illustrated in FIG. 3 which shows the measurements over time of selected parameters for controlling the feeding process of ensuring a gravimetrically constant amount material using an apparatus and a method according to the invention. Accordingly, in the curves shown the output flow of material from the discharge screw conveyor is shown marked "Flow". The revolutions per minute of the screw conveyor is also monitored and shown as "Dosing RPM". The pressure in the dosing container is shown as "Pressure" and the weight of the dosing container 20 is shown as "Static weight".

As can be seen in FIG. 3, the static weight is constantly decreasing in a linear decent over time. This shows that the weight of the discharged material per time unit is constant. Also the flow out of the dosing container is constant and so is the RPM of the discharge dosing screw 26.

When the level of content in the dosing container 22 is low, the dosing container 22 is filled with material from the storage container 20, as described above. In FIG. 3 there is shown how such a filling process affect the four parameters. As it is clear the "Static weight" increases rapidly. This filling process slightly influences the pressure in the dosing container 22, but only to a minor degree, and it can be seen that the discharge flow and the dosing RPM is practically constant throughout the feeding process.

The invention is described above with reference to some preferred embodiments. However, it is realised that other variations may be provided without departing from the scope of the invention as defined in the accompanying claims.

The invention claimed is:

1. An apparatus for gravimetric metering of a powdery bulk material, said system comprising:
   a storage container accommodating the bulk material;
   a mounting frame;
   a dosing container fixedly supported by the mounting frame;
   a feeding pipe for feeding bulk material from the storage container to a dosing container, the feeding pipe having a first flexible tube member, the first flexible tube member comprising a first compensator and a second compensator with a rigid tubular member arranged between the first compensator and the second compensator, the rigid tubular member being fixed to the mounting frame;
   a discharge pipe fixedly supported by the mounting frame;
   a dosing discharge device for continuously discharging bulk material from the dosing container to the discharge pipe; and
   at least one weighing cell, the dosing container being mounted on the at least one weighing cell and the discharge pipe is provided with a second flexible tube member.

2. The apparatus according to claim 1, further comprising a pneumatic feeding system, the pneumatic feeding system being fixedly supported on the mounting frame.

3. The apparatus according to claim 1, wherein a breather pipe is provided between an upstream end of the discharge pipe and a top end of the dosing container.

4. The apparatus according to claim 1, wherein the feeding pipe is provided with a sluice.

5. The apparatus according to claim 1, wherein the dosing discharge device is a screw conveyor adapted for continuously providing a predetermined volumetric amount of bulk material.

6. The apparatus according to claim 5, wherein the screw conveyor is adapted to provide a predetermined rotational speed in order to achieve the predetermined volumetric amount of bulk material.

7. The apparatus according to claim 1, wherein a plurality of feeding pipes is provided connecting a plurality of dosing containers to a common storage container.

8. A method of gravimetric metering of a powdery bulk material, said method comprising the steps of:
   batch feeding bulk material from a storage container through a feeding pipe to a dosing container mounted on at least one weighing cell;
   continuously discharging bulk material from the dosing container to a discharge pipe by a dosing discharge device for further processing of the bulk material;
   recording the gravimetric weight of the dosing container by the at least one weighing cell;
   whereby the feeding pipe is made axially flexible to compensate for any external displacement of the storage container and the feeding pipe, the feeding pipe being provided with a first flexible tube member and the discharge pipe being provided with a second flexible tube member, wherein the first flexible tube member comprises a first compensator and a second compensator with a tubular member therebetween, and wherein the tubular member is fixed to a mounting frame, which also fixedly supports the storage container and the discharge pipe.

9. The method according to claim 8, further comprising a pneumatic feeding system, the pneumatic feeding system being fixedly supported on the mounting frame.

10. The method according to claim 8, whereby any pressure difference between upstream end of the discharge pipe and the top end of the dosing container is equalized by a breather pipe.

11. The method according to claim 8, wherein the feeding pipe is provided with a sluice.

12. The method according to claim 8, wherein the dosing discharge device is a screw conveyor adapted for continuously providing a predetermined volumetric amount of bulk material.

13. The method according to claim 8, wherein said screw conveyor is adapted to provide a predetermined rotational speed in order to achieve the predetermined volumetric amount of bulk material.

14. The method according to claim 8, wherein the storage container is feeding a plurality of feeding pipes connecting a plurality of dosing containers.

\* \* \* \* \*